United States Patent Office 3,342,084
Patented Sept. 19, 1967

3,342,084
DIFFERENTIAL MECHANISM
Ralph R. Randall, Freeport, Ill., assignor to Dualoc Engineering Company, Rockford, Ill., a corporation of Illinois
Filed May 17, 1965, Ser. No. 456,239
8 Claims. (Cl. 74—711)

ABSTRACT OF THE DISCLOSURE

The differential of the present invention includes a drive pin extending transversely of the axis of rotation of the differential case and fixed to the case at its opposite ends. The pin extends through radially elongated bores in the differential pinion gears so that when the radially elongated axis of the bores is aligned with the plane of rotation of the case the pin shifts to an eccentric position relative to the axis of rotation of the differential pinion gears and thereby locks the pinion gears to rotate with the case. Sleeves are preferably mounted on the pin to extend through the bores of the pinions. The sleeves are dimensioned to have either rotating or sliding bearing contact with the bores in the pinions.

---

This invention relates to a differential mechanism and more particularly to a locking type differential for vehicles.

The conventional differential ordinarily used on such vehicles as automobiles and trucks is a relatively efficient device for transmitting torque to the driven wheels of the vehicle as long as the driving wheels have substantially equal traction. However, when the traction on the two driven wheels differs substantially, with the conventional differential the wheel having lesser traction has a tendency to spin while the other wheel remains stationary and the vehicle is therefore not propelled. This problem has been long recognized in the art of differentials and many differentials of the locking type have been proposed heretofore.

It is an object of the present invention to provide a locking type differential for the driven wheels of a vehicle that is of simple and economical construction and which, at the same time, is very effective to prevent wheel spinning and nevertheless permits differential action between the driven wheels readily when necessary.

It is a further object of the present invention to provide a locking type differential for the driven wheels of a vehicle which is of a very compact design and does not require any appreciable increase in the dimensions of conventional differentials.

The differential of the present invention may be considered as an improvement over the differentials shown in my co-pending applications, Ser. Nos. 214,353, filed Aug. 12, 1962, and 341,843, filed Jan. 29, 1964, now Patents Numbers 3,216,282 and 3,276,290, respectively. In the differentials disclosed in each of said two co-pending applications, a differential construction is provided wherein the pinion gears which mesh with the two axle gears are permitted to shift in a direction circumferentially of the ring gear on the differential case to a position wherein the pinion gears are locked against rotation relative to the axle gears so that in the locked position of the pinion gears the axle gears are caused to rotate as a unit with the differential case. In the construction shown in each of said two co-pending applications the means provided for enabling the pinion gears to shift to a position locked relative to the axle gears includes an axial projection on the outer ends of each pinion gear which extends into a bearing socket in the differential case. Within each bearing socket in the differential case there are arranged bearing members which engage the projections on the pinion gears and which are so designed as to permit the projections on the pinion gears to shift radially of the bearing socket to a position wherein the axis of rotation of the pinion gears is offset from the axis of the bearing socket.

The differential mechanism of the present invention operates on a principle substantially identical to the principle of operation of the differential mechanism illustrated and claimed in my said two co-pending applications. However, in the differential forming the subject matter of this invention, the shifting of the pinion gears to the locked position is obtained by forming an elongated opening in the pinion gears themselves through which pins anchored in the case extend, rather than be forming axial projections on the outer ends of the pinion gears.

In the drawings:

FIGS. 3 and 4 are somewhat diagrammatic views illustrating the locking action of the differential, FIG. 3 showing the unlocked and FIG. 4 showing the locked condition.

Figure 1:
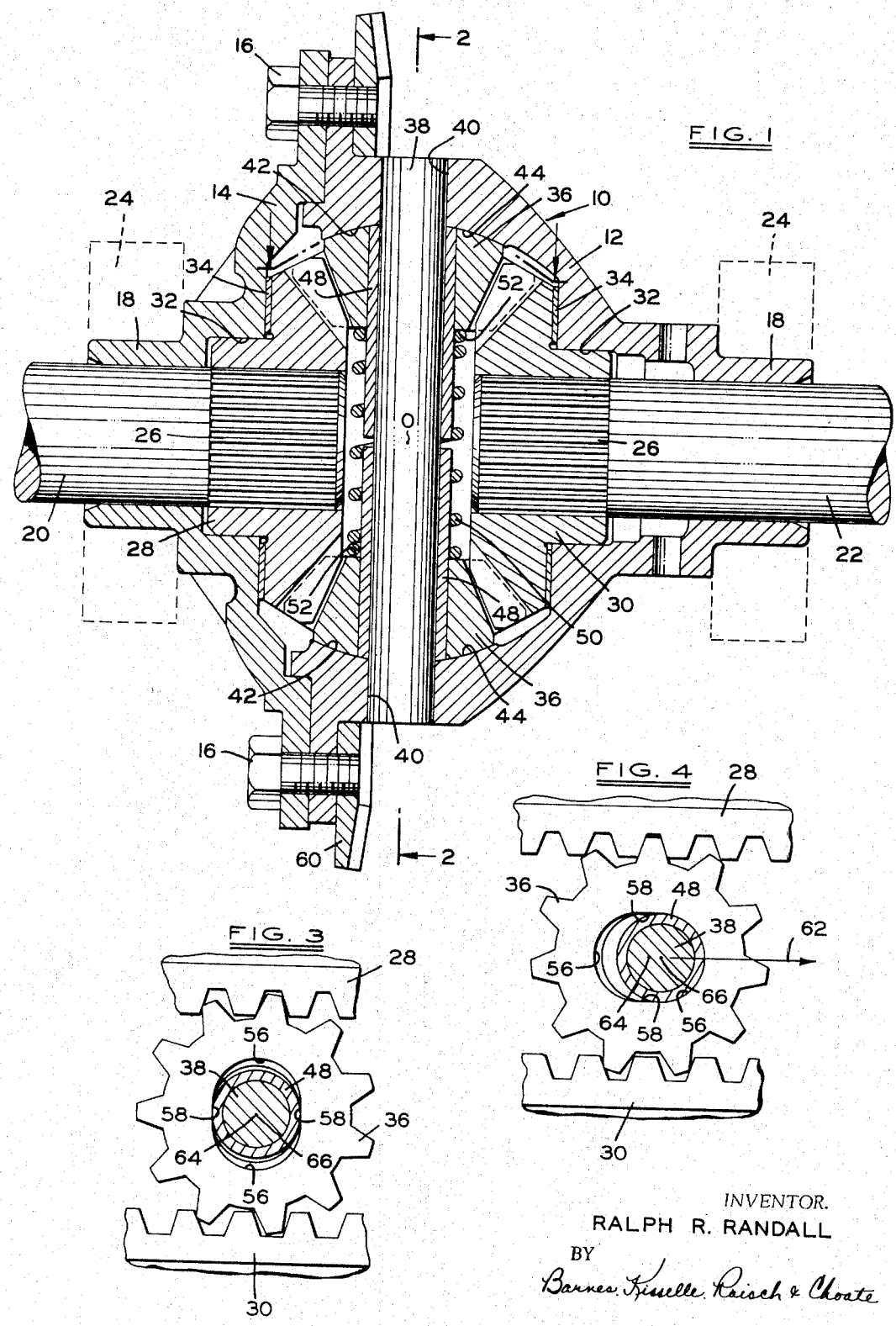
FIG. 1 is a cross-sectional view of a differential embodying the present invention taken along the wheel axis of the vehicle.

Referring to FIG. 1 the differential of the present invention includes a case 10 which in the embodiment illustrated comprises two half-sections 12 and 14 secured together into an integral unit by bolts 16. The two half-sections of case 10 are fashioned with hubs 18 in which the two wheel axles 20 and 22 are journalled. Hubs 18 are adapted to receive bearings 24 by means of which the case 10 is adapted to be journalled within an outer housing (not illustrated). The inner ends of axles 20 and 22 are splined as at 26 for connection with a pair of axle gears 28, 30. The sections 12 and 14 of the differential case 10 are fashioned with sockets 32 in which the hubs of axle gears 28, 30 are journalled, and flat disc bearings 34 are provided for taking the side thrust of gears 28, 30.

The two axle gears 28, 30 are interconnected by a pair of axially opposed bevel pinion gears 36. The two pinion gears 36 are in turn interconnected by a pin 38 which projects axially through gears 36 and has its opposite ends fixedly retained in sockets 40 formed in the case 10. As is illustrated in FIG. 1, the two pinion gears 36 intermesh with the axle gears 28, 30. The axis of rotation of pinion gears 36 is normal to and intersects the axis of rotation of axle gears 28, 30 at the point designated O in FIGS. 1 and 2. Each pinion gear 36 has its axially outer end spherically shaped as at 42, for mating engagement with a correspondingly shaped socket 44 in case 10.

Figure 2:
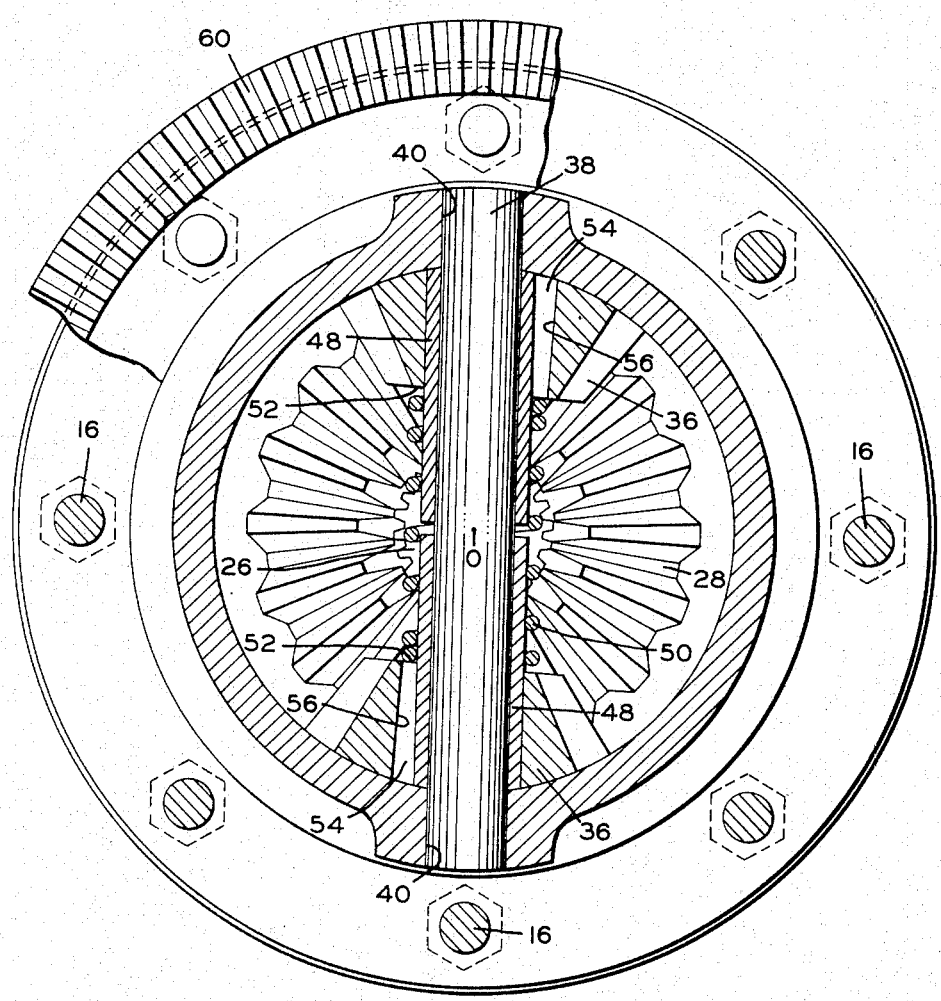
FIG. 2 is a sectional view taken along the line 2—2 in FIG. 1 and showing the differential in the locked condition.

In the embodiment illustrated in FIGS. 1 through 4, a pair of sleeves 48 is arranged on pin 38 and a compression spring 50 encircles sleeves 48 with its opposite ends bearing against the axially inner faces 52 of pinions 36. As is illustrated in FIGS. 2, 3 and 4, the axial opening 54 in each pinion gear 36 through which pin 38 and sleeve 48 project is radially elongated in one direction. Thus each opening 54 in pinions 36 has its opposite ends rounded as at 56 and these rounded opposite ends are connected by generally straight flat side walls 58. The distance between the side walls 58 corresponds generally to the outer diameter of sleeve 48, and the distance between the rounded ends 56 is, as illustrated, greater than the outer diameter of sleeve 46. In vertical section, as viewed in FIG. 2, the openings 54 taper slightly in a radially inward direction, that is, these openings are formed, as it were, by a cutting tool which oscillates about the point O.

As is conventional, the case 10 has secured thereto as by the screws 16, if desired, a driving ring gear 60 which is adapted to mesh with a pinion gear on the end of a vehicle drive shaft (not shown) to rotate case 10.

In operation, case 10 is rotatably driven about the axis of axles 20, 22 by ring gear 60. Assuming that the vehicle is traveling in a straight path and that there is thus no need for any differential action between the two axles, the case 10 rotates and the pinions 36 are caused to revolve therewith by reason of the driving connection between these pinions and the case through the pin 38. If the case 10 is rotating in the direction indicated by the arrow 62 in FIG. 4, then it is clear that the drive pin 38 with the sleeve 48 thereon engages the leading rounded end 56 of the elongated opening 54 in each pinion gear 36. In this positoin of pin 38 relative to the pinion gears 36, the axis of rotation of each pinion gear, designated 64, is shifted to an offset positoin relative to the center axis of pin 38, which is designated 66. It thus becomes apparent that as long as the axis 64 of rotation of each pinion gear 36 is offset from the axis 66 of pin 38, pinion gears 36 are prevented from rotating.

Thus pinion gears 36 are locked in the position illustrated in FIG. 4, and the two axle gears 28, 30 are likewise locked against rotation relative to case 10. Axle gears 28, 30 are thus caused to rotate as a unit with case 10. This condition obtains even though the traction on the two driving wheels connected with axles 20, 22 may differ very substantially. Both wheels are positively driven, wheel spinning is prevented, and the vehicle is propelled. With the differential in the locked condition illustrated in FIGS. 2 and 4, it will be appreciated that the power division will be such that the wheel with the greatest traction will receive the most torque.

The driving pinions 36 will remain in the locked condition until an external force is applied to these pinion gears which tends to cause them to rotate. This external force can be exerted on driving pinions 36 only by axle gears 28, 30. In turn the only external torque that can be applied to axle gears 28, 30 can result only from a required differential action between the wheels. Thus, if pinion gears 36 are in the locked condition, such as illustrated in FIGS. 2 and 4, and one of the driven wheels is forceably compelled to rotate faster than the other, such as when the vehicle negotiates a turn or when one of the driven wheels rides over a bump, then the externally applied torque tends to rotate pinion gears 36. This externally applied torque to pinion gears 36 causes the drive pin 38 with the sleeves 48 to shift to the centered position in the elongated openings 54 in pinion gears 36, that is, to the position illustrated in FIG. 3. As long as there is a need for differential action or, in other words, as long as one of the axle gears 28, 30 is positively driven by its wheel at a speed different from the other axle gear, pinion gears 36 will rotate about drive pin 38 as a center, and differential action will continue. However, as soon as the need for differential action between the two driving wheels of the vehicle ceases, the case 10 will shift circumferentially relative to the two pinion gears 36 to a position wherein the driving pin 38 engages the oppositely disposed rounded ends 56 of the elongated openings 54 in the two pinion gears so that the pinion gears assume an eccentric pinion gears so that the pinion gears assume an effect a locking of the differential.

As mentioned previously, when the differential is in locked condition illustrated in FIGS. 2 and 4, the driving torque on case 10 will be positively transferred to both driving wheels of the vehicle and thus prevent spinning, even when the traction on the two wheels differs substantially. The power division between the two driven wheels will be distributed until such time as an external force is applied to the axle gears 28, 30. It therefore follows that with the differential mechanism of this invention, differential action is always obtained when required and the delivery of power to the wheel having the greatest traction is assured, irrespective of the fact that the traction of both wheels due to the condition of the road surface may differ widely. It will be noted that with the present arrangement, since the pin 38 extends directly through each of the pinions 36 the drive connection between pin 38 and pinion gears 36 is along a portion of each pinion which is coextensive with the teeth on these pinions which intermesh with the teeth on the axle gears 28, 30. This is an important feature of the present invention.

It will also be observed that compression spring 50 tends to maintain the pinion gears 36 in the centered position when differential action is taking place. When the gears 36 shift to the offset position shown in FIG. 2, spring 50 is compressed because the axially inner faces of gears 36 assume an inclined position relative to pin 38.

Figure 6:
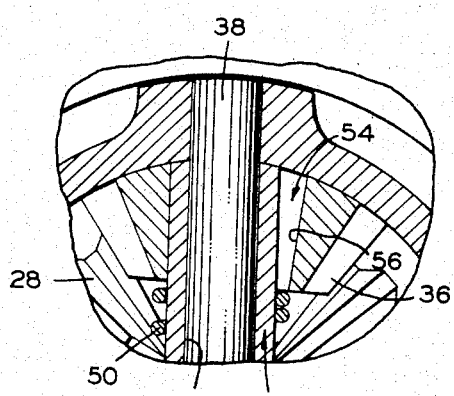
FIG. 6 is a fragmentary view taken along the line 6—6 in FIG. 5.
Figure 5:
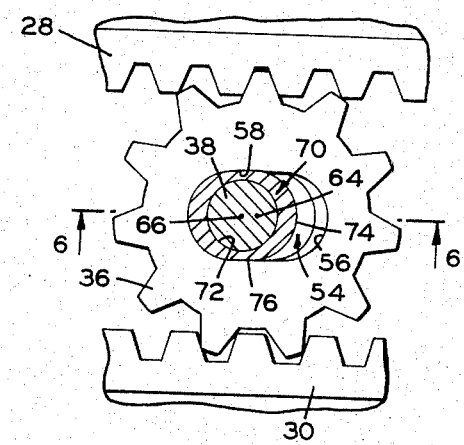
FIG. 5 is a view similar to FIG. 4 and showing a modified form of construction.

Referring now to FIGS. 5 and 6, the differential shown therein differs from that previously described only with respect to the sleeves on drive pin 38. In the arrangements illustrated in FIGS. 5 and 6, the sleeves 70 on drive pin 38 have their outer periphery elongated in radial section. Each sleeve has a cylindrical center bore 72 adapted to receive pin 38 with a nice rotatable fit. However, around their outer periphery each sleeve 70 is fashioned with diametrically opposite rounded ends 74 which are connected by generally flat side walls 76. The rounded ends 74 of sleeves 70 are adapted for mating engagement with the rounded ends 56 of the elongated openings 54 in the two pinions 36, and the flat side walls 76 of the sleeves 70 are adapted for sliding engagement with the flat side walls 58 of the elongated holes 54 in pinions 36.

With the arrangement shown in FIGS. 5 and 6, the operation is substantially the same as that previously described. However, in the arrangement illustrated in FIGS. 5 and 6, since the sleeves 70 have flattened side walls 76, the unit pressure exerted by the sleeves 70 against the sides of the elongated openings 54 when the mechanism is subjected to differential action, is substantially lower than would be the case with the arrangement illustrated in FIGS. 1 through 4.

Figure 8:
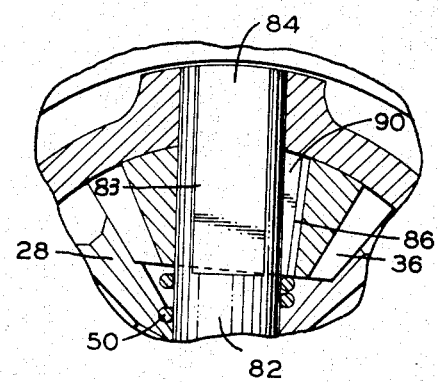
FIG. 8 is a sectional view taken along the line 8—8 in FIG. 7.
Figure 7:
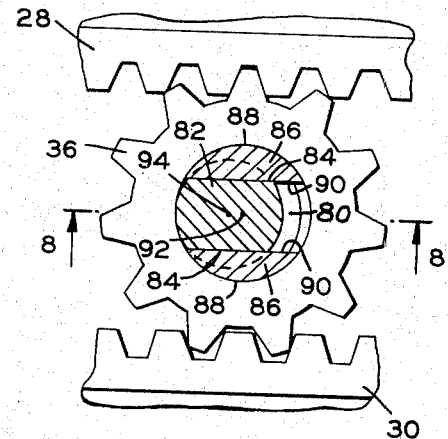
FIG. 7 is a view similar to FIG. 4 and showing a further modified form of the present invention.

FIGS. 7 and 8 illustrate another embodiment of the present invention which is designed to reduce the unit pressures when the mechanism is subjected to differential action. In the latter arrangement each pinion gear 36 has formed therein a conically shaped bore 80. The portion 83 of the driving pin 82 which extends through the conical bore 80 has a diameter substantially less than the minimum diameter of bore 80 and is fashioned with flattened side faces 84 on diametrically opposite sides thereof. A pair of guide blocks 86 are arranged in the conical bore of each pinion gear 36 against the flat faces 84 of driving pin 82. Each guide block 86 has a conically shaped outer surface 88 which conforms to the conical bore 80 in pinions 36 and a flattened inner surface 90 which is slidably engaged by the flattened side faces 84 of driving pin 82. With this arrangement, as is the case with the two previous embodiments described, the driving pin 82 is permitted to shift in the elongated opening formed by the guide blocks 86 and the conical bore 80 in each pinion gear to a position wherein the axis of rotation of each pinion gear, designated 92, is offset from the central axis of drive pin 82. In this condition the differential is locked and remains locked until an external force is applied to either of the two axle gears 28, 30 to positively rotate the pinions 36 and thus shift them to a position where they are concentric with the axis of drive pin 82.

In the embodiments illustrated in FIGS. 5 through 8, depending upon the loads imposed upon the differential, the pinion gears 36 might be slightly larger than the pinion gears 36 of the embodiment of the invention illustrated in FIGS. 1 through 4. However, in each embodiment of the present invention, it will be observed that the driving connection between the driving pin and pinion gears 36 is generally coextensive with the teeth on the driving pinions 36 which mesh with the teeth on the axle gears 28, 30.

I claim:
1. A differential mechanism comprising a rotatable case forming a driving member, a pair of spaced-apart, axially aligned axle gears in the case journalled for rotation at the axis of rotation of the case, a pinion gear interposed between and meshing with each of said axle gears, a pin extending axially through said pinion gear and having its radially outer end fixed in said case against movement circumferentially of the case, means forming an opening extending axially through the pinion gear and through which the pin extends, said opening being elongated in a direction radially of the pinion gear such that the pin and the case are permitted to shift in a circumferential direction relative to the pinion gear when the elongated axis of the opening in the pinion gear is aligned in a direction circumferentially of the case to a position wherein the axis of rotation of the pinion gear is offset from the axis of the pin to thereby lock the pinion gear against rotation in the case and a sleeve on said pin forming a bearing rotatable on the pin and engaging the sides of the elongated opening in the pinion gear, said sleeve being radially elongated on its outer surface to a lesser extent than the opening in the pinion gear so that the pin and sleeve are permitted to shift radially of the pinion as a unit.

2. A differential mechanism as called for in claim 1 wherein the cross-sectional shape of said opening in the pinion gear comprises rounded opposite ends connected by straight side walls and the outer periphery of the sleeve in cross-section comprises rounded opposite ends connected by straight side walls.

3. A differential mechanism comprising a rotatable case forming a driving member, a pair of spaced-apart, axially aligned axle gears in the case journalled for rotation at the axis of rotation of the case, a pinion gear interposed between and meshing with each of said axle gears, a pin extending axially through said pinion gear and having its radially outer end fixed in said case against movement circumferentially of the case, means forming an opening extending axially through the pinion gear and through which the pin extends, said opening being elongated in a direction radially of the pinion gear such that the pin and the case are permitted to shift in a circumferential direction relative to the pinion gear when the elongated axis of the opening in the pinion gear is aligned in a direction circumferentially of the case to a position wherein the axis of rotation of the pinion gear is offset from the axis of the pin to thereby lock the pinion gear against rotation in the case, said pinion gear being formed with a conical bore extending axially therethrough and said means forming said elongated opening in the pinion comprising a pair of guide blocks in the form of segments having arcuate outer surfaces conforming to the conical bore in the pinion gear and having generally flat inner surfaces, the portion of the pin extending through said pinion gear having flattened opposite sides engaging the flat inner surfaces of said guide blocks and the dimension of the pin in a direction normal to said flat faces being less than the diameter of the conical bore in the pinion gear.

4. A differential mechanism comprising a rotatable case forming a driving member, a pair of spaced-apart, axially aligned axle gears in the case journalled for rotation at the axis of rotation of the case, a pinion gear interposed between and meshing with each of said axle gears, a pin extending axially through said pinion gear and having its radially outer end fixed in said case against movement circumferentially of the case, means forming an opening extending axially through the pinion gear and through which the pin extends, said opening being elongated in a direction radially of the pinion gear such that the pin and the case are permitted to shift in a circumferential direction relative to the pinion gear when the elongated axis of the opening in the pinion gear is aligned in a direction circumferentially of the case to a position wherein the axis of rotation of the pinion gear is offset from the axis of the pin to thereby lock the pinion gear against rotation in the case and means biasing said pinion gear axially in a direction toward the outer end of the pin, said last-mentioned means being tensioned in response to shifting of the pin in the elongated opening in the pinion gear to said position wherein the axis of the pin is offset from the axis of rotation of the pinion gear.

5. A differential mechanism comprising a rotatable case forming a driving member, a pair of spaced-apart and axially aligned axle gears journalled in the case at the axis of rotation of the case, a pair of diametrically opposed pinion gears arranged between and meshing with the two axle gears and having their axis of rotation normal to and intersecting the axis of said axle gears, a pin extending axially through said pinion gears and having its opposite ends fixed in said case against movement circumferentially of the case, means forming an opening extending through each pinion through which the pin extends, each of said openings being elongated in a direction radially of the pinion such that the pin and case are permitted to shift in a circumferential direction relative to the pinion gears when the elongated axis of the opening in each pinion gear is aligned in a direction circumferentially of the case to a position where the axis of rotation of each pinion gear is offset from the axis of the pin to thereby lock the pinion gears against rotation in the case and a compression spring encircling said pin and having its opposite ends bearing against the axially inner end faces of said pinion gears, said spring tending to shift said pinion gears in a direction away from one another and being compressed in response to shifting of the pin to said position wherein the axis of the pin is offset from the axis of rotation of the pinion gears.

6. A differential mechanism comprising a rotatable case forming a driving member, a pair of spaced-apart and axially aligned axle gears journalled in the case at the axis of rotation of the case, a pair of diametrically opposed pinion gears arranged between and meshing with the two axle gears and having their axis of rotation normal to and intersecting the axis of said axle gears, a pin extending axially through said pinion gears and having its opposite ends fixed in said case against movement circumferentially of the case, means forming an opening extending through each pinion through which the pin extends, each of said openings being elongated in a direction radially of the pinion such that the pin and case are permitted to shift in a circumferential direction relative to the pinion gears when the elongated axis of the opening in each pinion gear is aligned in a direction circumferentially of the case to a position where the axis of rotation of each pinion gear is offset from the axis of the pin to thereby lock the pinion gears against rotation in the case and a sleeve member extending through the elongated opening in each pinion gear and forming a bearing rotatable on the pin, said sleeve member engaging the elongated opening in each pinion gear on its outer surface and being shiftable as a unit with said pin in the elongated openings in the pinion gears, the cross-sectional shape of said elongated opening in each pinion gear comprising a pair of rounded opposite ends connected by generally straight side walls.

7. A differential mechanism as called for in claim 6 wherein the portion of the pin extending through each pinion gear is of cylindrical cross-section and said sleeve member has a cylindrical hole therethrough which corresponds in size with the said cylindrical portion of said pin, the outer periphery of the sleeve being dimensioned to have a close fit between the straight side walls of the elongated openings in the pinion gears.

8. A differential mechanism as called for in claim 7 wherein said sleeve is radially elongated in cross-section to a lesser extent than the elongated opening in each pinion gear.

References Cited

FOREIGN PATENTS 228,358  11/1943  Switzerland.

FRED C. MATTERN, JR., *Primary Examiner.*

DAVID J. WILLIAMOWSKY, *Examiner.*

J. A. WONG, *Assistant Examiner.*